United States Patent [19]

Metz

[11] 4,022,076
[45] May 10, 1977

[54] ANTI-BACKLASH AUTOMATICALLY REVERSING NUT FOR A DIAMOND THREAD SCREW

[75] Inventor: Joseph R. Metz, Georgetown, Conn.

[73] Assignee: Norco, Inc., Ridgefield, Conn.

[22] Filed: Feb. 17, 1976

[21] Appl. No.: 658,623

[52] U.S. Cl. .............................. 74/441; 74/89.15; 74/424.8 A; 74/459

[51] Int. Cl.$^2$ ................. F16H 55/18; F16H 27/02; F16H 1/18; F16H 55/22

[58] Field of Search .............. 74/441, 459, 424.8 R, 74/424.8 A, 89.15

[56] References Cited

UNITED STATES PATENTS

| | | | |
|---|---|---|---|
| 2,644,341 | 7/1953 | Rabe | 74/459 X |
| 3,779,094 | 12/1973 | LaBarre | 74/424.8 R |

Primary Examiner—Leonard H. Gerin
Attorney, Agent, or Firm—H. Gibner Lehmann; K. Gibner Lehmann

[57] ABSTRACT

An anti-backlash, automatically reversing nut construction for use with a diamond thread screw, comprising a nut proper and a separate follower movable with respect to the nut proper, both said parts having through bores for receiving the screw. The follower part carries a non-shiftable thread-engaging ball extending into the bore thereof, and also a laterally-movable thread engaging ball likewise extending into the bore. The movable ball is capable of being shifted translationally on the follower in directions substantially parallel to the screw axis whereby it can transfer from engagement in one groove to engagement in another groove of the screw to thereby effect a change in the axial direction of travel of the nut assemblage. The nut proper also carries a non-shiftable thread-engaging ball and a laterally-movable thread-engaging ball, the latter being capable of shifting translationally on the nut proper, also in directions substantially parallel to the screw axis. Spring means are provided, engageable with both the nut proper and follower, for biasing these parts in opposite axial directions with respect to one another, thereby eliminating looseness of the nut assemblage on the threads of the screw. The arrangement is such that for a given relative sense of rotation between the screw and nut assemblage, the latter can undergo reciprocating movement between the ends of the screw, with the reversals in the axial direction of travel of the nut assemblage being automatically effected with virtually zero backlash.

28 Claims, 22 Drawing Figures

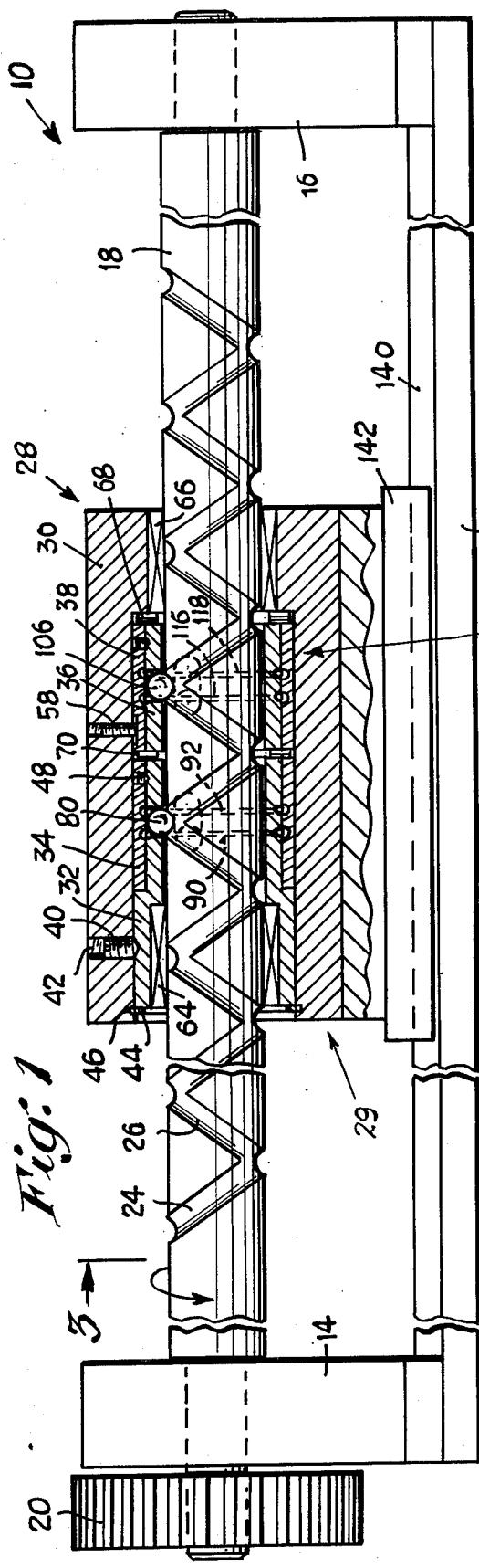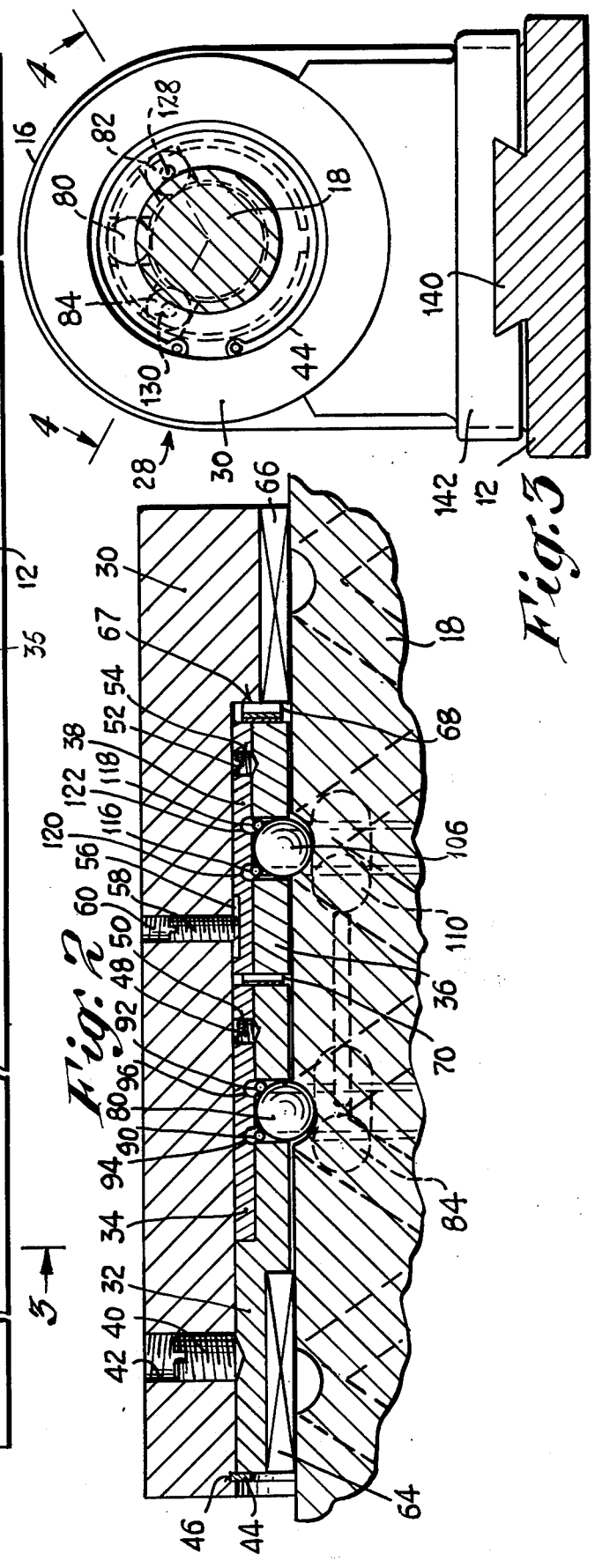

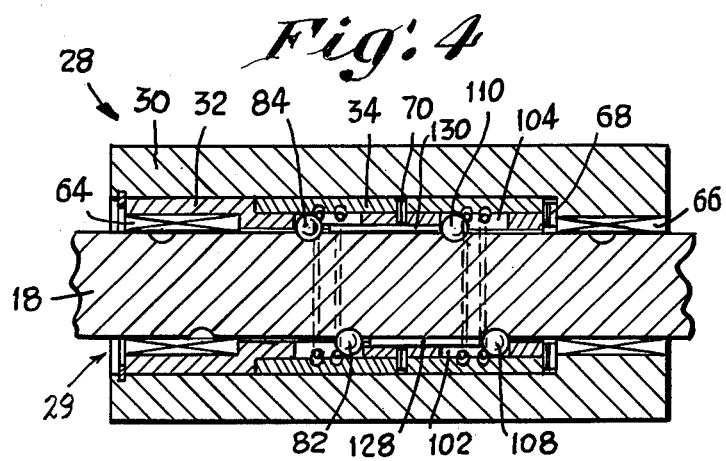
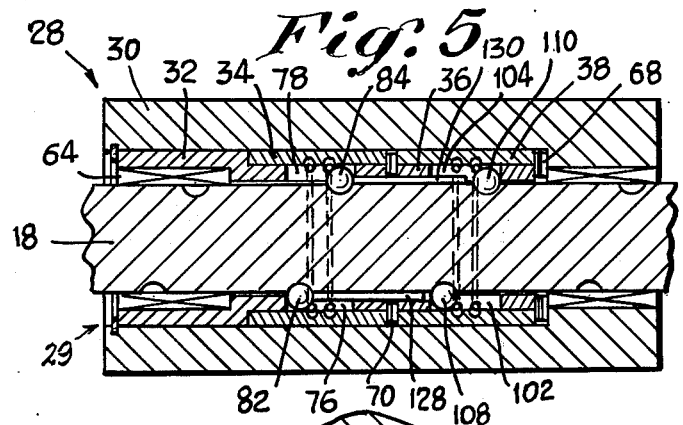
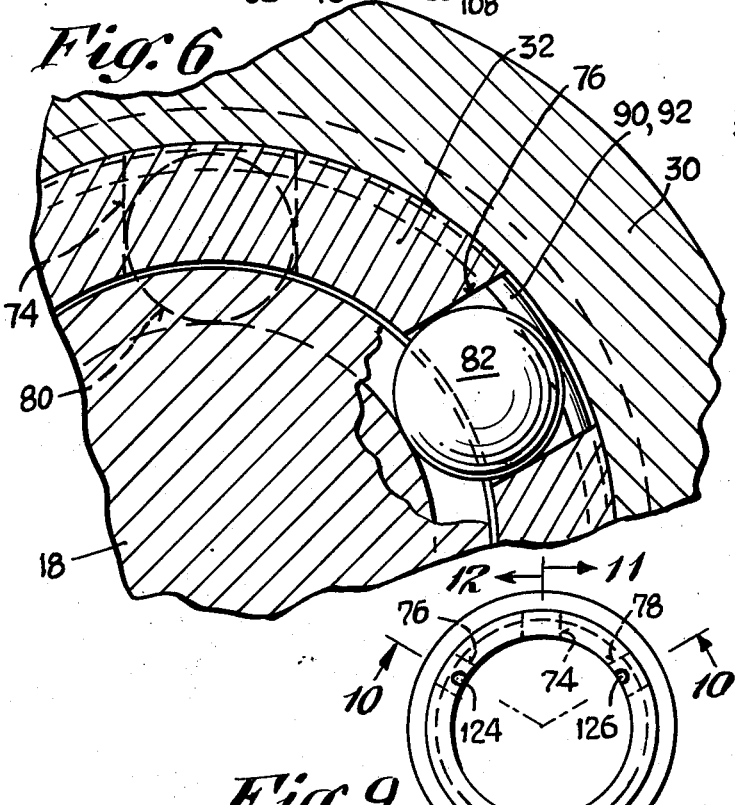
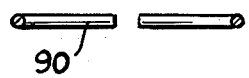
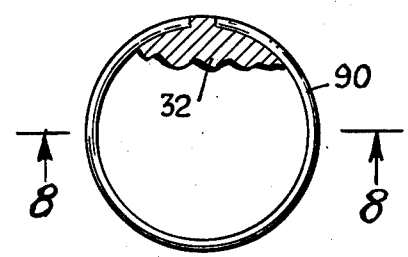
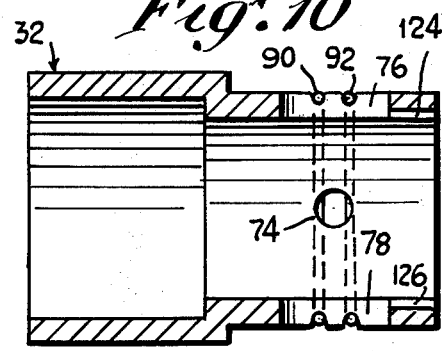
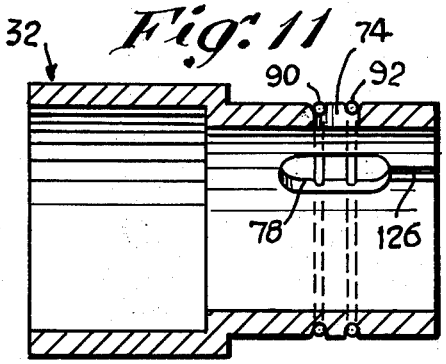
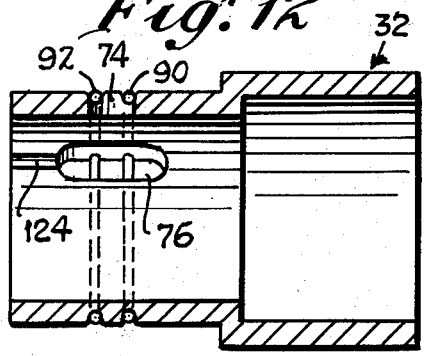
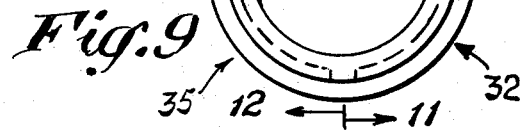

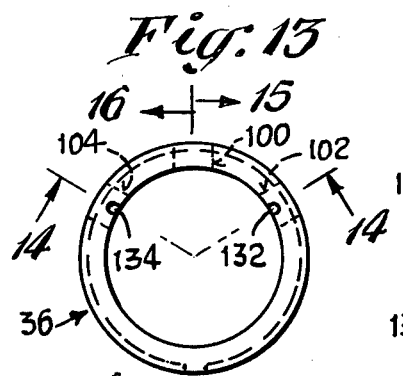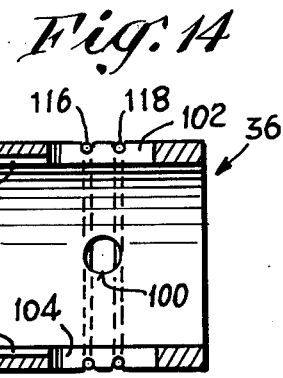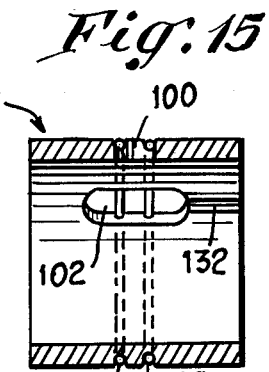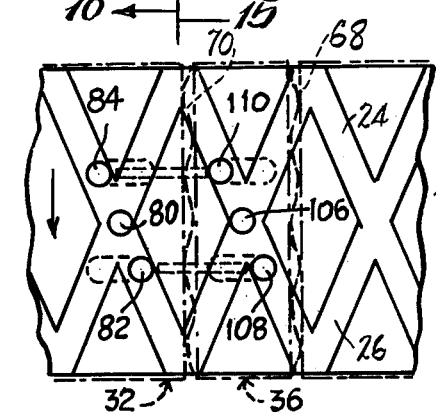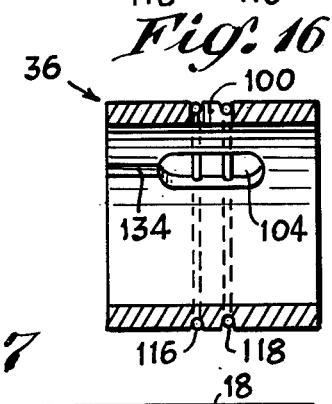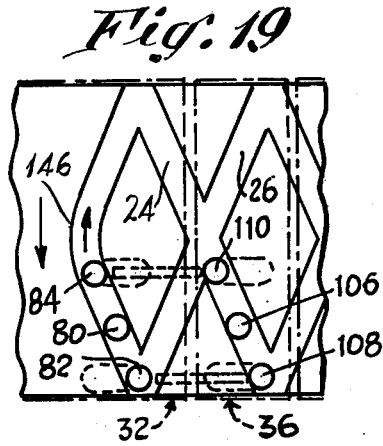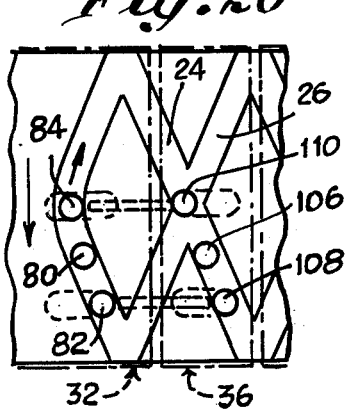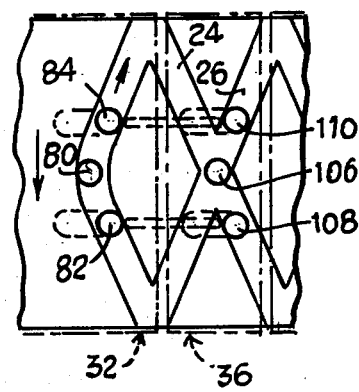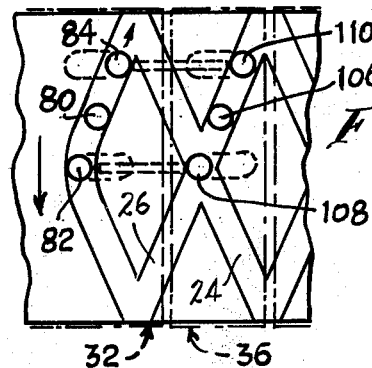

ANTI-BACKLASH AUTOMATICALLY REVERSING NUT FOR A DIAMOND THREAD SCREW

CROSS REFERENCES TO RELATED APPLICATIONS AND PATENTS

1. Co-pending application of Joseph R. Metz, U.S. Ser. No. 563,793, filed Mar. 31, 1975, and entitled REVERSING NUT FOR A DIAMOND THREAD SCREW.
2. U.S. Pat. No. 3,799,094, dated Dec. 18, 1973, in the name of Berger A. LaBarre, entitled REVERSING NUT FOR A DIAMOND THREAD SCREW.

BACKGROUND

This invention relates generally to reversing nut constructions for use with diamond thread screws, and more particularly to devices of this type adapted to undergo reciprocating movement along the length of the screw, with the reversing movements in the axial direction of travel of the nut being automatically effected.

Prior diamond thread reversing screws generally employed camming grooves or shoulders having curved reversing edges at the opposite extremities of the screw. The traverse mechanisms associated with such screws typically involved elongated sliding groove followers which were contoured so as to closely follow the curvature of the grooves. Such followers were of sufficient dimension to straddle the groove intersections so that they would not jump from a left-hand to a right-hand groove or vice versa. At the ends of the screw, reversal of the nut occurred by virtue of the reversing end grooves being considerably enlarged to enable the elongated follower to swing from one groove to the oppositely directed groove.

Other types of reversing mechanisms employed fixed pins extending into the bore of a nut and riding along one of the grooves of the screw. In such devices no reliable drive means was provided for insuring continuity of travel of the pin through the groove intersections. Thus, there existed the possibility that the pin might "jump" to the oppositely directed thread groove and thus reverse the nut's axial direction of travel prematurely.

A prior automatically reversing nut construction for a diamond thread screw is shown in U.S. Pat. No. 3,779,094 wherein the nut body incorporates a series of thread-engaging roller elements. One is fixed against axial or translational movement on the nut body, while others are capable of undergoing shifting movement respectively between oppositely disposed extreme positions. All the rollers are carried by needle bearings, with anti-friction thrust bearings and bowed spring washers for biasing the rollers into engagement with the screw threads. The axially shiftable rollers are carried in slide grooves, arranged parallel to the nut axis. Virtually all friction which was encountered was of the rolling-type as opposed to the sliding type. As a result, very high efficiency and smooth operation were obtainable.

One of the problems associated with the automatically reversing nut device disclosed in the above identified patent is that the use of multiple needle bearings and thrust-type ball bearings tended to increase the overall cost of the device. In addition, the adjustment of such bearing assemblages tended to be both critical and time-comsuming. Special machining was required on the screw in order to precisely form the grooves thereof in a way to accept the conical-shaped nose portions of the roller elements. Also, the slides on which the shiftable rollers were carried represented additional parts which had to be machined to close tolerances in order to insure smooth, trouble-free operation and performance.

Also, due to slight variations in the thread pitch between adjacent areas of the screw, there tended to be a degree of looseness between the latter and the rollers. This gave rise to backlash, which was undesirable for certain more critical applications where fairly close tracking of the nut on the screw was required.

SUMMARY

The above drawbacks and disadvantages automatically reversing nut devices are obviated by the present invention, which has for an object the provision of an improved automatic reversing nut for a diamond thread screw which is especially simple in its construction, inexpensive to manufacture and assemble, and which eliminates backlash while employing an absolute minimum number of separate parts. A related object is the provision of a reversing nut construction as above set forth, which is reliable in its operation and has reduced susceptibility to jamming or malfunction. Still another object of the invention is the provision of a nut follower device which can be employed with a screw of the type having simple, scalloped groove formations that are easier to form than the thread formations previously employed. Yet another object of the invention is the provision of a nut construction as above wherein excessive looseness between the nut and screw is minimized by simple components involving low cost, with backlash being virtually eliminated as a consequence, making the device especially well suited for critical applications requiring close tracking of the nut on the screw.

The above objects are accomplished by the provision of an automatically reversing nut assemblage for a diamond thread screw comprising a nut proper to receive the screw, and a follower movable with respect to the nut proper and having an opening also for receiving the screw. The follower carries a non-shifting thread-engaging ball and also a laterally-movable thread-engaging ball both of which extend partially into the opening for engagement with the walls of the grooves in the screw. The laterally-movable ball can be shifted translationally with respect to the follower in directions substantially parallel to the screw axis, to thereby transfer from engagement with one groove to engagement with the other groove and effect a change in the axial direction of travel of the nut assemblage with respect to the screw. The nut proper also carried a thread-engaging non-shifting ball and a laterally-movable thread-engaging ball, the latter being also capable of being shifted translationally on the nut proper in directions substantially parallel to the screw axis, whereby it can transfer from engagement with one groove to engagement with the other groove of the screw. Especially simple and effective spring means are provided, engaging the nut proper and the follower, for biasing the parts in opposite axial directions with respect to one another. The arrangement is such that there is minimized excessive looseness between the threads of the screw and the nut proper and follower, resulting in reduced backlash and greatly improved tracking.

Other features and advantages will hereinafter appear.

In the drawings, illustrating a preferred embodiment of the invention:

FIG. 1 is a view, partly in front elevation and partly in section, of a reversing traverse mechanism incorporating the improved reversing nut assemblage of the present invention, the nut assemblage comprising a nut proper, and a follower axially movable with respect thereto.

FIG. 2 is an enlarged fragmentary view of the screw and nut arrangement of FIG. 1.

FIG. 3 is a section taken on line 3—3 of FIG. 1.

FIG. 4 is a section taken on line 4—4 of FIG. 3, showing the two movable balls associated with the nut proper and the two movable balls associated with the follower, each of the four balls being disposed in extreme positions, respectively.

FIG. 5 is a view like FIG. 4, except showing each of the four balls in oppositely disposed extreme positions, respectively.

FIG. 6 is an enlarged fragmentary section of the screw and nut assemblage of FIG. 1, showing various details of the mounting arrangements for two of the balls carried by the nut proper.

FIG. 7 is a top plan view of an annular spring ring of the type employed in the reversing nut assemblage of FIG. 1, and showing a fragmentary view of a part of the nut proper.

FIG. 8 is a section taken on line 8—8 of FIG. 7.

FIG. 9 is a right end elevation of the bushing and liner portion of the nut proper of the assemblage of FIG. 1.

FIG. 10 is a section taken on line 10—10 of FIG. 9.

FIG. 11 is a section taken on line 11—11 of FIG. 9.

FIG. 12 is a section taken on line 12—12 of FIG. 9.

FIG. 13 is a left end elevation of the follower per se of the nut construction of FIG. 1.

FIG. 14 is a section taken on line 14—14 of FIG. 13.

FIG. 15 is a section taken on line 15—15 of FIG. 13.

FIG. 16 is a section taken on line 16—16 of FIG. 13.

FIG. 17 is a top plane view of the diamond thread screw of FIG. 1, particularly illustrating reversing grooves disposed near the opposite ends thereof for effecting reciprocating movement of the nut.

FIG. 18 is a development of a portion of the diamond thread screw of FIG. 1, illustrating the locations of the three balls associated with the nut proper and the three balls associated with the follower, as the nut assemblage is traveling toward the left with respect to a screw rotating in the direction indicated.

FIG. 19 is a view like FIG. 18, showing the nut assemblage approaching the left reversing groove and illustrating the relative positions of the various balls associated with the nut proper and follower.

FIG. 20 is a view like FIG. 18, showing the leading ball carried by the nut proper about to be shifted with respect thereto, by the reversing groove.

FIG. 21 is a view like FIG. 18, showing the leading ball carried by the nut proper having been shifted toward the right with respect thereto, wherein the nut assemblage begins to reverse its axial direction of travel.

FIG. 22 is a view like FIG. 18, showing the relative positions of the balls after the nut assemblage begins to travel toward the right with respect to the screw.

Referring first to FIG. 1, there is illustrated a traverse mechanism generally designated by the numeral 10, comprising a frame or base 12 having upright support members 14, 16 constituting end bearings for a diamond thread screw 18. The latter carries a gear 20 at one end, adapted to be engaged by a pinion (not shown) connected to a suitable source of power such as an electric motor. The diamond thread screw 18 comprises thread formations defining criss-crossed grooves 24, 26 of scalloped configuration. As shown in FIG. 1, the grooves 24 are of the right-hand variety, while the grooves 26 are of the left-hand type. The diamond thread screw 18 is adapted for turning movement in either direction, with the opposite ends thereof being supported on the bearings 14 and 16 respectively.

In accordance with the present invention there is provided a novel reversing nut assemblage generally designated by the numeral 28, comprising a nut proper 29 having an outer housing or body 30, an inner bushing 32, and a liner 34 disposed therebetween, and comprising a follower 35 including a sleeve 36 and collar 38 which are movable as a unit with respect to the nut proper. As shown in FIG. 2, the nut body 30 and bushing 32 are rigid with one another and held in a fixed relative position by a set screw 40 received in a threaded hole 42 in the body 30 and a snap retainer washer 44 received in an annular recess 46 in the bore of the body. A second set screw 48 received in a threaded hole 50 in the liner 34 rigidly secures the latter to the bushing 32. By this arrangement the outer part or body 30, the bushing part 32 and the liner part 34 are rigid and move as a unit with respect to the screw 18.

In a similar manner, the sleeve 36 and collar 38 of the follower 35 are held rigid with respect to one another by a set screw 52 received in a threaded hole 54 in the collar 38. The latter includes a longitudinal recess 56 in its outer surface, the walls of which are engaged by a set screw 58 received in a threaded hole 60 in the body 30. The recess is shown particularly in FIG. 2 and has a width approximately equal to the diameter of the set screw 58. By such an arrangement, the sleeve 36 and collar 38 are capable of moving as a follower unit with respect to the body 30, in directions parallel to the axis of the screw 18, but are prevented from turning with respect to the body.

Referring again to FIGS. 1 and 2, disposed near the opposite ends respective of the body 30 is a pair of centralizer roller or needle bearings 64, 66 adapted to engage the crests of the threads of the diamond thread screw 18, to maintain the nut assemblage in axial alignment therewith. As the screw rotates, it effects simultaneous rolling and sliding friction with the individual rollers of the bearings 64, 66 resulting in relative high efficiency operation with minimal friction and wear. The bore of the body 30 further includes a shoulder 67 against which there is disposed a pair of nested wave washers or springs 68 of substantially annular configuration. The assembly consisting of the nested springs 68 directly engages the adjacent ends of the sleeve 36 and collar 38, and maintains them in spaced relation with respect to the shoulder 67. An additional spring or wave washer 79 is provided, sandwiched between the bushing 32 and liner 34 on the one hand, and the sleeve 36 and collar 38 on the other hand. By this arrangement, the follower 35 comprising the sleeve 36 and collar 38 is seen to be floating with respect to the body, but is kept from turning with respect thereto by the engagement of the set screw 58 with the walls of the slot 56.

Referring now to FIGS. 1, 2, 4, 5 and 9–12, the bushing 32 is seen to include radially extending recesses 74, 76 and 78, the latter two being elongate and aligned with the axis of the screw. The wall of the recess 74 is cylindrical in configuration. A series of balls 80, 82, 84 is disposed respectively in said recesses, the balls 82, 84 being capable of being laterally shifted so as to engage opposite ends of their elongate recesses respectively. The bushing 32 further includes a pair of annular recesses which respectively receive split spring rings 90, 92 selectively engageable with the balls 82, 84 for holding them in extreme or end positions in their respective recesses. The spring rings are shown in FIGS. 7 and 8. When either ball is shifted by the threads of the screw 18, as will be explained below, the springs 90, 92 yield outwardly to enable by-pass of the particular ball. In accomplishing this, the inner surface of the liner 34 has annular clearance recesses 94, 96 disposed adjacent the bushing recesses respectively, which constitute clearance space for the springs when they are urged outwardly by one of the shifting balls 82, 84.

Referring now to FIGS. 13–16, the sleeve 36 of the follower includes radially extending recesses 100, 102 and 104, the latter two being elongate and aligned with the axis of the screw. The walls of the recess 100 is substantially cylindrical. A series of balls 106, 108 and 110 are disposed respectively in the slots or recesses, the balls 108, 110 being capable of shifting so as to engage opposite ends of their elongate slots respectively. The sleeve 36 further includes a pair of annular recesses on its outer surface, which respectively receive a pair of split spring rings 116, 118 similar to the rings 90, 92, engageable with the balls 108, 110 for holding them in extreme or end positions in their respective slots. As in the case of the balls 82, 84, when either ball 108, 110 is shifted by the threads of the screw 18, as will be explained below, the springs 116, 118 yield outwardly to enable by-pass of the particular ball. The inner surface of the collar 38 has annular clearance recesses 120, 122 disposed adjacent the sleeve recesses respectively to enable such by-pass to occur, providing clearance space for the springs 116, 118 when they are urged outwardly by one of the shifting balls, 108, 110.

Referring now to FIG. 10, the walls of the bushing 32 further include a pair of longitudinal bores 124, 126 which respectively receive a pair of actuator pins 128, 130 adapted to engage the balls 82, 84 respectively in the slots 76, 78. It will be understood that the bores 124, 126 intersect and break through the walls of these slots as shown. In addition, the walls of the sleeve 36 include a pair of longitudinal bores 132, 134 which are in alignment with the bores 124, 126 respectively and which are adapted to receive the other ends of the actuator pins 128, 130 respectively. The bores 132, 134 are seen to intersect and break through the walls of the slots 102, 104 so as to enable their engagement with the balls 108, 110 respectively.

FIG. 1 illustrates a typical arrangement of traverse mechanism wherein the diamond thread screw 18 is adapted to be rotatably driven, and wherein the nut assemblage 28 is held against rotation by means of a slide bar 140, which is substantially parallel and coextensive with the screw 18, and a slide bar follower 142 which is carried by the nut. By such an arrangement, the latter can undergo axial movement with respect to the screw, but is held against rotation.

The operation of the improved reversing nut construction can now be readily understood by referring to FIGS. 1–6 and 18–22. FIG. 17 shows the diamond thread screw, having end reversing grooves 146, 148 respectively at the extremities thereof. The balls 80 and 106 are retained in their respective recesses against lateral movement with respect to the respective bushing 32 or sleeve 36. However, they are both capable of undergoing rolling movement in position as they ride in the grooves of the diamond thread screw 18. The balls 82 and 84 are each capable of shifting axially with respect to the bushing 32, as permitted by the dimensions of their respective slots. When in its left hand extreme position in the slot 76 (FIG. 5), the ball 82 is engaged by the spring 90 and maintained in this position until it is shifted by the threads of the screw 18 in the vicinity of one of its reversing grooves. Similarly, when the ball 82 is disposed in its right hand extreme position in the slot 76 (FIG. 4), it is engaged by the spring 92 until shifted by the threads of the screw 18 in the vicinity of one of the reversing grooves. For example, when the ball 82 is shifted from left to right, it momentarily urges the spring 90 outwardly and moves to a point where it engages both springs 90, 92 simultaneously. Further shifting urges the spring 92 outwardly until the ball reaches the opposite end of the slot, wherein the spring 92 assumes its normal position occupying the recess in the cage 32. Similar action occurs during the shifting of the ball 84 from left to right.

Referring again to FIGS. 2, 4 and 5, it can be seen that the balls 108, 110 are held in oppositely disposed extreme positions in their respective slots by their engagements with the springs 116, 118. During shifting of the ball 108, it urges the springs 116, 118 outwardly in succession until it becomes seated in the opposite end of its respective slot. Shifting of the ball 110 effects similar successive movements of the springs 116, 118. The manner in which such shifting occurs will be discussed below.

For purposes of explanation, it will be assumed that the balls 82, 108 are disposed in their right-hand extreme positions as shown in FIG. 4. Referring to FIGS. 18–22, and with the screw rotating in the direction indicated in FIG. 1, it will be seen that the balls 80, 82, 84, 106, 108 and 110 all occupy the right-hand groove 24 of the diamond thread screw 18. Such rotation will give rise to movement of the reversing nut assemblage 28 toward the left in FIG. 1. FIGS. 18–22 show the development of the screw, with the positions of the balls being indicated by solid lines, and the oppositely disposed extreme positions of the balls 82, 84, 108 and 110 being designated by dotted lines. It is noted that the balls 80, 84 are carrying the load and engage the right-hand face of the right-hand groove 24. Due to the action of the nested wave washers 68, forming a spring which is slightly stiffer than the spring 70, the follower comprising the sleeve 36, collar 38 and balls 106, 108 and 110 is being biased toward the left in FIGS. 18 and 19 wherein the balls 106–110 engage the left-hand face of the right-hand groove 24. Such an arrangement minimizes excessive slop and looseness between the nut proper 29, the follower 35, and the screw 18 and gives rise to reduced backlash and improved tracking. Reversal in the axial direction of movement at the left end of the screw 18 is effected by the engagement of the leading ball 84 with the left-hand reversing groove 146. Such engagement is illustrated in FIG. 19. As this occurs, it can be seen that this leading ball 84 is shifted with respect to the nut proper 29 toward the right, while the latter continues to travel toward the left due to the engagement of the ball 80 and the right-hand face of the groove 24. Continued rotation of the screw gives rise to further movement of the nut assemblage 28 toward the left such that the fixed ball 80 and the movable balls 82, 84 will eventually assume the positions illustrated in FIG. 20. At this point, the shifting ball 84 begins to shift the ball 110 through the medium of the actuator pin 130, such that the ball 110 will move from the right-hand groove 24 to the left-hand groove 26 before it leaves the intersection. In accomplishing this, the shape of the reversing groove 146 is modified somewhat, by flattening, such that, during reversal, the ball 84 will be disposed slightly closer to the ball 110 in order to insure that the latter is adequately shifted into groove 26 by the time the intersection has passed. Continued rotation of the screw gives rise to an axial reversal in the direction of travel of the nut assemblage 28, since the ball 110 has reached its opposite extreme position and begins to carry the nut toward the right; similarly in FIG. 22, further rotation of the screw will effect additional movement of the nut assemblage 28 toward the right, thus shifting the trailing balls 82, 108 toward the left with respect to the nut. Such shifting of the trailing balls occurs because now both the balls 106, 110 are carrying the nut assemblage 28 toward the right, and the trailing balls 82, 108 are confined to switch from the right-hand groove 24 to the left-hand groove 26. With the nut assemblage traveling toward the right, the load is shared by the balls 106, 110 when neither is disposed at a groove intersection, or by the remaining one of the balls 106, 108 when the other is disposed at an intersection. In FIG. 22, the balls 106, 110 are seen to be engaging the left face of the left-hand groove 26 with the nut assemblage traveling to the right, with the balls 80, 84 engaging the right face of the left-hand groove 26, such an arrangement tending to minimize looseness and slop between the nut proper 29 and the follower 35.

From the position of FIG. 22, the nut assemblage 28 will continue traveling toward the right until it arrives at the location of the right-hand reversing groove 148 (FIG. 17). Upon its arrival, the ball 110 will be engaged by the reversing groove 148 and shifted toward the left thereby, thus effecting a second reversal of axial direction of travel with respect to the screw. This reversal occurs in the same manner as that illustrated above, except that the ball 110 is the first to be shifted by the reversing groove, and simultaneously effects shifting of the ball 84 through the actuator pin 130. The reversing nut assemblage thus undergoes a simple reciprocating movement between the extremities of the diamond thread screw, as determined by the particular locations of the reversing grooves 146, 148.

With the nut assemblage traveling toward the right as in FIG. 22, any load applied thereto (in a direction tending to oppose its movement) is carried by the balls 106, 110 when neither is at a groove intersection. When either of the balls 106, 110 crosses a groove intersection, the load is carried by the other until the intersection is passed. The arrangement is such that at least one ball is available to carry the load at all times.

For relative rotation between the nut assemblage and screw in one direction, a total of four balls are needed. In the example discussed above, the balls 82 and 108 could be omitted, since they do not carry the load at any time. If the sense of rotation were reversed, the four balls 80, 82, 106 and 108 would selectively carry the load, and the balls 84, 110 would be omitted. In some of the appended claims, there is specified a movable ball associated with the nut proper, which could cover either the ball 82 or 84 depending on which direction the screw was rotating. Similarly, the movable ball associated with the follower 35 could be either the ball 108 or 110, again depending on the sense of relative rotation.

The pitch of the thread grooves may be such that the ball 80 is straddled and essentially engaged by the spring rings 90, 92 simultaneously, and the ball 106 is straddled and engaged by the rings 116, 118, simultaneously. Other ratios of thread pitches could be employed, aside from the 1:1 ratio shown, in order to provide different rates of traverse for a given rate of screw rotation.

As an alternate construction, the screw could be non-rotating and axially driven by a rotating nut assemblage, and the above disclosure is not intended to be limiting in this respect.

While the term "followers" has been applied to the assemblage of sleeve 36 and collar 38, obviously the nut proper 29 can be thought of as a follower, depending on the direction of turning of the screw 18.

From the above it can be seen that I have provided a novel and improved zero-backlash reversing nut construction which is especially simple in construction and easy to assemble and build, as well as being especially low in cost. The spring loading provided by the wave washers allows for slight variations in thread pitch between adjacent parts of the screw, resulting in improved accuracy and tracking and minimizing any tendency for binding.

The device is thus seen to represent a distinct and advance improvement in the technology of reversing mechanisms.

Each and every one of the appended claims defines a distinct aspect of the invention separate from the others, and each claim is accordingly to be treated in this manner when the prior art devices are examined in any determination of novelty or validity.

Variations and modifications are possible without departing from the spirit of the invention.

I claim:

1. An anti-backlash reversing nut assemblage for use with a diamond thread screw having threads defining criss-crossed thread grooves, comprising in combination:
   a. a nut proper adapted to receive the screw,
   b. a follower axially movable with respect to said nut proper and having an opening for receiving the screw,
   c. a non-shiftable thread-engaging ball carried by the follower and extending partially into the opening thereof,
   d. means mounting said ball against lateral movement on the follower,
   e. a laterally-movable thread-engaging ball carried by the follower and extending partially into the opening thereof,
   f. guide means on the follower for enabling the movable ball to be translationally shifted with respect thereto in directions substantially parallel to the screw axis whereby it can transfer from engagement with one groove of the screw to engagement with another groove of the screw, thereby to effect a change in the axial direction of travel of the nut assemblage with respect to the screw,
   g. an addtional non-shiftable thread-engaging ball carried by the nut proper,
   h. an additional laterally-movable thread-engaging ball carried by the nut proper, i. guide means on said nut proper for enabling the additional movable ball to be translationally shifted with respect thereto in directions substantially parallel to the screw axis whereby it can transfer from engagement with one groove of the screw to engagement with another groove of the screw, and j. spring means for biasing the nut proper and follower in opposite axial directions with respect to one another, thereby to minimize looseness of the assemblage on the threads of the screw.

2. The invention as defined in claim 1, wherein:
a. said follower comprises an annulus extending completely around the screw and having a wall portion with an opening and a slot respectively receiving the balls associated therewith,
b. the walls of said opening and slot respectively constituting the ball mounting means and the guide means of the follower.

3. The invention as defined in claim 2, wherein:
a. the length of the slot associated with the movable ball of the follower is at least twice the diameter of the latter.

4. The invention as defined in claim 1, wherein:
a. said nut proper comprises an annulus extending completely around the screw and having a wall portion with an opening and a slot respectively receiving the balls associated therewith,
b. the walls of said slot constituting the guide means for the movable ball of the nut proper.

5. The invention as defined in claim 4, wherein:
a. the length of the slot associated with the movable ball of the nut proper is at least twice the diameter of the latter.

6. The invention as defined in claim 1, and further including:
a. a second thread-engaging, laterally-movable ball carried by the follower,
b. guide means on the follower for enabling said second movable ball to be shifted in directions substantially parallel to the screw axis, from engagement with one groove to engagement with another groove of the screw,
c. said laterally-movable balls on the follower being circumferentially spaced from one another,
d. a second thread-engaging, laterally-movable ball carried by the nut proper, and
e. guide means on the nut proper for enabling said second movable ball to be shifted in directions substantially parallel to the screw axis, from engagement with one groove to engagement with another groove of the screw.
f. said laterally-movable balls on the nut proper being circumferentially spaced from one another.

7. The invention as defined in claim 1, and further including:
a. yieldable detent means carried by the nut proper and engageable with the laterally-movable ball thereof, for yieldably holding the latter in either of two spaced-apart predetermined positions on the nut proper,
b. yieldable detent means carried by the follower and engageable with the laterally-movable ball thereof for yieldably holding the latter in either of two spaced-apart predetermined positions on the follower,
c. said yieldable detent means of the follower biasing said movable ball thereof into engagement with side portions of the grooves of the screw, and d. said yieldable detent means of the nut proper biasing said movable ball thereof into engagement with side portions of the grooves of the screw.

8. The invention as defined in claim 7, wherein:
a. both said yieldable detent means comprise spring rings carried by said nut proper and follower, engageable with the movable balls thereof and capable of releasably retaining the balls in given extreme positions.

9. The invention as defined in claim 8, wherein:
a. both said yieldable detent means comprise additional spring rings carried by said nut proper and follower and spaced axially respectively from the first-mentioned rings, and engageable with the movable balls of the nut proper and follower for releasably retaining the balls in other extreme positions.

10. The invention as defined in claim 7, wherein:
a. said nut proper comprises a liner and a bushing,
b. said bushing being annular and having radially extending apertures constituting said openings and slots,
c. said bushing being telescopically received in the liner, and
d. means for securing the bushing in the liner in said telescoping relation.

11. The invention as defined in claim 10, wherein:
a. said bushing has a substantially annular groove extending about its periphery,
b. said yieldable detent means comprising a spring ring received in said groove and being selectively engageable with the movable ball of the nut proper to thereby releasably hold the ball in one extreme position against lateral movement with respect thereto,
c. said bushing having an additional substantially annular groove extending about its periphery and being axially spaced from the first groove,
d. said yieldable detent means further comprising a second spring ring received in the additional groove and being selectively engageable with the said movable ball to thereby releasably hold the same in another extreme position against lateral movement with respect thereto.

12. The invention as set forth in claim 11, wherein:
a. said liner has a pair of annular grooves in its inner surface, adjacent to and overlying the annular grooves of the bushing,
b. said liner grooves providing clearance spaces for the spring rings when the latter are momentarily urged in radially outward directions under the action of the movable ball of the nut body.

13. The invention as defined in claim 7, wherein:
a. said follower comprises a sleeve having a substantially annular groove extending about its periphery,
b. said yieldable detent means of the follower comprising a spring ring received in said groove of the sleeve and being selectively engageable with the movable ball of the follower to thereby releasably hold the same against lateral movement with respect thereto.

14. The invention as defined in claim 13, wherein:
a. said sleeve has an additional substantially annular groove extending about its periphery, axially spaced from the first groove,
b. said yieldable detent means of the follower comprising a second ring received in the additional groove and being selectively engageable with the movable ball of the follower to thereby releasably hold the same against lateral movement with respect thereto.

15. The invention as defined in claim 14, and further including:
   a. a collar carried by the sleeve,
   b. said collar having a pair of annular grooves in its inner surface, adjacent to and overlying the annular grooves of the sleeve,
   c. said collar grooves providing clearance spaced for the spring rings when the latter are momentarily urged in radially outward directions under the action of the movable ball of the follower.

16. The invention as defined in claim 15, wherein:
   a. said nut proper is annular,
   b. said follower being telescopically receivable in said nut proper, and
   c. said collar having a sliding fit with the bore of the nut proper.

17. The invention as defined in claim 1, and further including:
   a. additional spring means engageable with the nut proper and follower for opposing the biasing action of the first spring means, whereby the follower is held in a position of equilibrium with respect to the nut proper.

18. The invention as defined in claim 1, and further including:
   a. means engageable with the movable ball of the nut proper and the movable ball of the follower, for effecting lateral shifting of one movable ball in response to lateral shifting of the other movable ball.

19. The invention as defined in claim 18, wherein:
   a. said follower and nut proper have aligned bores respectively,
   b. said means for effecting lateral shifting comprising an actuator pin receivable in said aligned bores,
   c. the ends of said actuator pin being selectively engageable with said movable balls respectively.

20. The invention as defined in claim 1, and further including:
   a. an additional laterally-movable ball carried by the nut proper,
   b. an additional laterally-movable ball carried by the follower, and
   c. means engageable with the additional movable balls of the nut proper and follower, for effecting lateral shifting of one of the additional movable balls in response to lateral shifting of the other.

21. The invention as defined in claim 1, wherein:
   a. said nut proper is annular and has an internal shoulder,
   b. said follower being disposed within said nut proper,
   c. said spring means being disposed between and engaging said internal shoulder and said follower, whereby the follower is held in a position of equilibrium with respect to the nut proper.

22. The invention as defined in claim 1, wherein:
   a. the spring means comprises a wave washer disposed between the nut proper and follower.

23. The invention as defined in claim 1, wherein:
   a. said spring means comprises two separate and independent springs acting on the nut proper and follower in opposition to each other,
   b. one of said spring being stiffer and stronger than the other.

24. The invention as defined in claim 23, wherein:
   a. said separate springs comprise wave washers.

25. The invention as defined in claim 24, wherein:
   a. the stronger and stiffer spring comprises a plurality of nested wave washers.

26. The invention as defined in claim 1, wherein:
   a. the nut proper includes a hollow portion in which the follower is contained and axially movable,
   b. said spring means comprising a spring engageable with the hollow portion of the nut proper and with the follower.

27. The invention as defined in claim 26, wherein:
   a. said spring means includes a second spring disposed in said hollow portion of the nut proper and spaced axially from said first-mentioned spring.

28. A reversing nut assemblage for use with a diamond thread screw having threads defining crisscrossed grooves, comprising in combination:
   a. a nut proper having a through opening to receive the screw,
   b. a non-shiftable thread-engaging ball,
   c. means mounting the ball against lateral movement thereof on the nut proper, said ball extending into the said opening for engagement with the screw threads,
   d. a laterally-movable ball carried by the nut proper, said ball extending into the opening thereof for engagement with the screw threads,
   e. guide means on the nut proper for enabling said movable ball to be translationally shifted in directions along the axis thereof whereby it can transfer from engagement with one groove wall to engagement with another groove wall of the screw, thereby to effect a change in the axial direction of travel of the nut assemblage with respect to the screw,
   f. a second laterally-movable ball carried by the nut proper and extending into the opening thereof for engagement with the screw threads,
   g. guide means on the nut proper for enabling said second movable ball to be shifted in directions subtantially parallel to the axis thereof, from engagement with one groove wall to engagement with another groove wall of the screw,
   h. said balls being circumferentially spaced from one another, and
   i. yieldable detent means engageable with said laterally-movable balls for respectively yieldably holding the same in either of two spaced-apart predetermined positions on the nut proper,
   j. said yieldable detent means comprising spring wire loops carried by and extending circumferentially of the nut proper and straddling the said non-shiftable thread-engaging ball thereof.

* * * * *